(12) United States Patent
Kitano et al.

(10) Patent No.: US 6,437,301 B1
(45) Date of Patent: Aug. 20, 2002

(54) INDUCTION HEATING ROLLER APPARATUS

(75) Inventors: Yoshio Kitano; Kozo Okamoto, both of Kyoto; Yukio Horie, deceased, late of Kyoto, all of (JP), by Yoko Horie, legal heir

(73) Assignee: Tokuden Co., Ltd., Kyoto (JP)

( * ) Notice: Subject to any disclaimer, the term of this patent is extended or adjusted under 35 U.S.C. 154(b) by 0 days.

(21) Appl. No.: 09/671,353

(22) Filed: Sep. 27, 2000

(51) Int. Cl.$^7$ ................................................ H05B 6/14
(52) U.S. Cl. ....................... 219/619; 219/652; 219/665; 492/46; 100/328; 100/334
(58) Field of Search ................................. 219/619, 647, 219/652, 469, 470, 471, 665, 663; 492/16, 46, 9, 10; 29/895, 895.1; 100/328, 334

(56) References Cited

U.S. PATENT DOCUMENTS

| 4,811,992 A | | 3/1989 | Steiner ................... 301/105 R |
| 5,254,070 A | * | 10/1993 | Callhoff ........................ 492/16 |
| 5,553,729 A | * | 9/1996 | Kitano et al. ................. 219/619 |

FOREIGN PATENT DOCUMENTS

| DE | 1286344 | | 1/1964 | |
| DE | 4401448 A1 | | 7/1995 | |
| JP | 4-36987 | * | 2/1992 | ................. 219/619 |
| JP | 4-39890 | * | 2/1992 | ................. 219/619 |
| JP | 2616798 | | 3/1997 | |
| JP | 10-104978 | * | 4/1998 | |

OTHER PUBLICATIONS

Japanese Abstract—04039890, Tokuden Co. Ltd., Feb. 10, 1992.

Japanese Abstract—07260628, Niigata Konbata, Oct. 13, 1995.

\* cited by examiner

*Primary Examiner*—Philip H. Leung
(74) *Attorney, Agent, or Firm*—Morgan, Lewis & Bockius LLP

(57) ABSTRACT

In an induction heating roller apparatus of the present invention, Rolling bearings 10 and a sliding bearings 14 are provided between drive shafts 2 of a roller body 1 and a support rod 9. When a trouble occurs in the rolling bearings 10, a rotational torque is transmitted from the drive shafts 2 through the rolling bearings 10 to the support rod 9. The sliding bearings 14 operate during the transmission of the rotational torque to the support rod 9, and the rolling bearings 10 slips relative to the support rod 9. The slip prevents that the support rod 9 co-rotates with the drive shafts.

4 Claims, 2 Drawing Sheets though its magnitude is small. The rotational torque is transmitted to the sliding bearing, and converted into a slide frictional force or a slide frictional torque. Accordingly, a rotational torque to be transmitted to the support rod is considerably reduced. As a result, the support rod little turns. A rotational torque of a magnitude enough to disconnect the lead wire derived from the induction heating mechanism is not transmitted to the support rod. If the sliding bearings are properly designed, the turning block bar coupled to the support rod is not turned to strike the stopper, viz., the impact is not exerted on the turning block bar and the stopper.

INDUCTION HEATING ROLLER APPARATUS

BACKGROUND OF THE INVENTION

1. Field of the Invention

The present invention relates to an induction heating roller apparatus, and more particularly to an induction heating roller apparatus of the type in which a support rod supporting an induction heating mechanism is inserted into drive shafts provided at both ends of a roller body.

2. Description of the Related Art

A known this type of the apparatus is an induction heating roller apparatus constructed such that drive shafts are integrally formed at both ends of a hollow roller body, the drive shafts are rotatably supported on a machine frame with bearings interposed therebetween, an induction heating mechanism with an induction coil is disposed within the roller body while being supported by a support rod, and the support rod is inserted into the drive shafts, and the support rod is supported on the drive shafts with the aid of the rolling bearings, whereby the induction heating mechanism is supported in a suspending fashion within the roller body, The induction heating roller apparatus is constructed as shown in FIG. 3. In the figure, reference numeral 1 designates a rotatable, hollow cylindrical roller body 1, both ends of the roller body 1 are integrally coupled with hollow drive shafts 2 via journals 3. The drive shafts 2 are rotatably supported on a fixed machine frame 5 with the aid of bearings 4 located outside. When the drive shafts 2 are rotated by a proper drive source (e.g., a motor), the roller body 1 is rotated.

An induction heating mechanism 8, which is formed with an iron core 6 and an induction coil 7 wound on the iron core, is disposed within the roller body 1. The induction heating mechanism 8 is supported at both ends by a support rod 9. The support rod 9 is supported on the drive shafts 2 by means of rolling bearings 10. With this structure, the induction heating mechanism 8 is supported in a suspending fashion within the roller body 1. Reference numeral 11 designates a lead wire led out of the induction coil 7. The lead wire 11 passes through the induction heating mechanism 8 and connects to an AC power supply for magnetic excitation, which is located outside.

Reference numeral 12 indicates a turning-block bar 12 integrally formed with the support rod 9. Reference numeral 13 is a stopper against which the turning-block bar 12 will hit. When as described above, the drive shafts 2 is rotated by the external drive source, it often takes place that the rotational force of the drive shafts 2, although it is a less magnitude, is transmitted to the support rod 9 through rotational resistance of the rolling bearings 10. If the support rod 9 and the induction heating mechanism 8 are greatly turned by the rotational force, the lead wire 11 will be disconnected in an extreme case. Such turn of the support rod 9 is prevented by the combination of the turning-block bar 12 and the stopper 13 which will hit against the former prevent.

In the structure, the rolling bearings 10 supporting the support rod 9 will often suffer wear, scorching or the like, and will be subjected to repeated stress, possibly being fatigue broken. In the rolling bearings 10 suffering from such undesired phenomenon and fatigue breakage, the rolling bearings 10 do not work normally, so that the rotational resistance of them greatly increases. For this reason, a little rotational torque, which is transmitted when the rolling bearings are normal, becomes large and is transmitted to the support rod 9.

The great rotational torque transmitted damages the turning-block bar 12 and the stopper 13, and the support rod 9 and hence, the induction heating mechanism 8 are rotated. As a result, the lead wire 11 is disconnected. Such a mechanical trouble, if occurs, cannot be cured by merely replacing the rolling bearings 10 with a new one. To completely cure it, it is necessary to disassemble the roller body 1 and to additionally repair the winding of the induction coil 7.

Another solving means to solve the problem was proposed and matured to the patent (see Japanese patent No. 2616798). The patent uses a torque detector for detecting the rotational torque transmitted from the drive shafts 2 to the support rod 9. When the torque detector detects an increase of the torque in excess of a predetermined torque value, it outputs a signal, and the drive shafts 2 are stopped in rotation in response to the output signal. In this way, the patent succeeds in avoiding the undesired rotation of the support rod 9 caused by the trouble of the rolling bearings 10.

The patent is ineffective for the roller body 1 of large weight in solving the above-mentioned problem. That is, when the torque detector detects a machinery trouble of the rolling bearing 10, and the power supply to the drive source and the drive shafts 2 is responsively turned off. However, the drive shafts will continue their turn because of the inertia, and be stopped after certain time elapses. If the rolling bearings 10 are greatly damaged and their rotational resistance considerably increases, the support rod 9 is greatly turned and the lead wire 11 will be disconnected. And the induction heating mechanism 8, which is not originally designed so as to rotate, is also turned and damaged. Further, the torque detector will be damaged.

SUMMARY OF THE INVENTION

Accordingly, an object of the present invention is to provide an induction heating roller apparatus in which, when a mechanical trouble occurs in the rolling bearings for the support rod supporting the induction heating mechanism and do not work normally, and the trouble is detected and a drive source for the drive shaft is stopped, the apparatus delays the transmission of a rotation of the support rod by the co-rotation, which results from a rotational torque transmitted from the drive shafts to the support rod by an inertia rotation of the drive shafts which continues till the drive shafts are completely stopped.

To achieve the above object, there is provided an induction heating roller apparatus in which the support rod is supported on the drive shafts with the aid of the rolling bearings, and the induction heating mechanism is supported in a suspending fashion within the roller body. In the present invention, the induction heating roller apparatus comprises sliding bearings being disposed between the drive shafts and the rolling bearings or between the support rod and the rolling bearings.

A trouble occurs in the rolling bearing and it does not work well in a rotation. In an initial stage of the trouble, the rolling bearing is not yet broken. However, a rotational torque will be gradually transmitted from the drive shafts to the support rod through the rolling bearing. When the rotational torque reaches such a predetermined value as not to damage the rolling bearing, a drive source of the drive shafts is stopped. Accordingly, the drive shafts still continue their rotation by the inertia. If the rolling bearing is damaged during this inertial rotation, a large rotational torque will be transmitted from the drive shafts to the support rod through the rolling bearings.

At this time, the drive shafts slip relative to the support rod because of the presence of the sliding bearings. Therefore, it never happens that the support rod and the induction heating mechanism co-rotate greatly, although the inertial rotation of the drive shafts continues. The operation of the sliding bearings may be limited, in its time duration, to within the inertia rotation of the drive shafts. Accordingly, those of compact size may be used and arranged.

DETAILED DESCRIPTION OF THE PREFERRED EMBODIMENT

Figure 1:
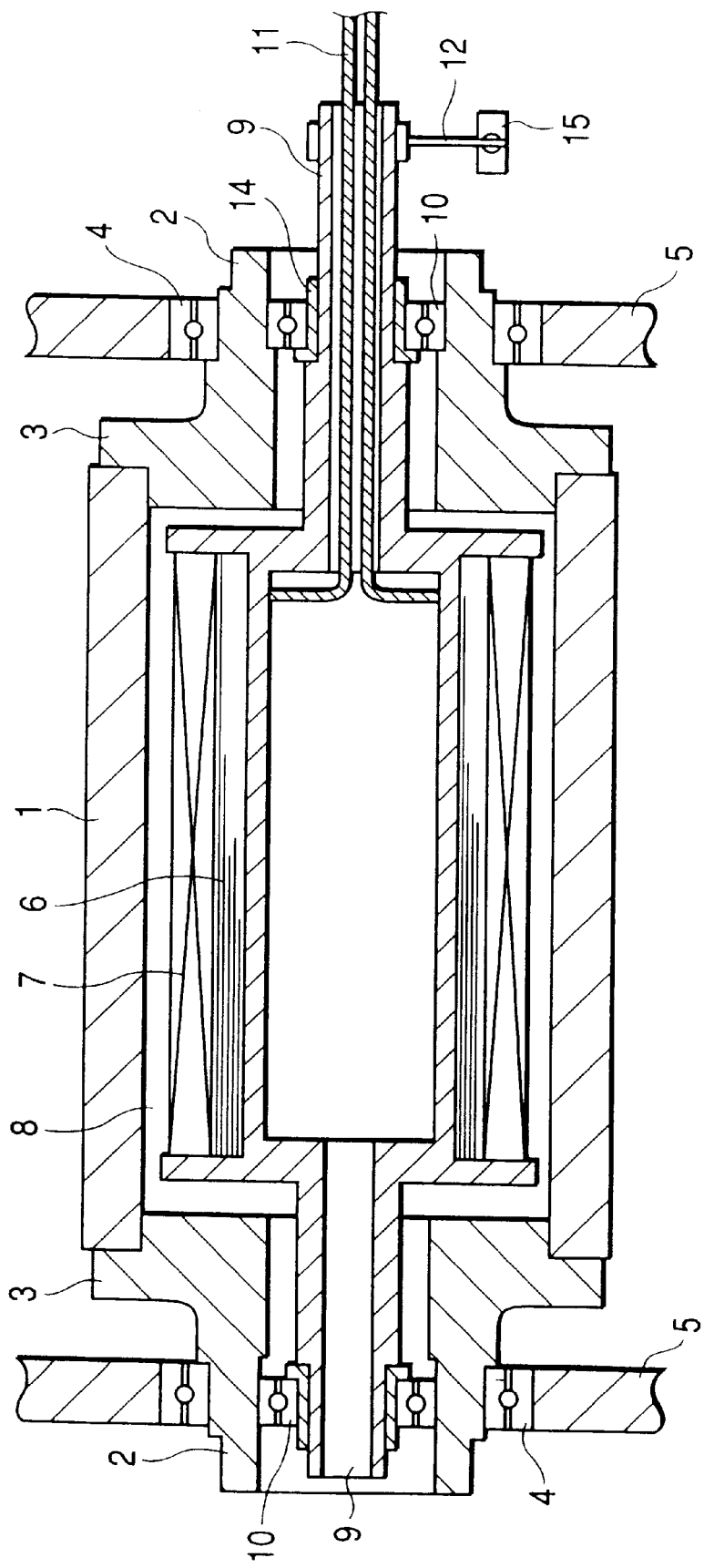
FIG. 1 is a cross sectional view showing an induction heating roller apparatus constructed according to the present invention.
Figure 3:
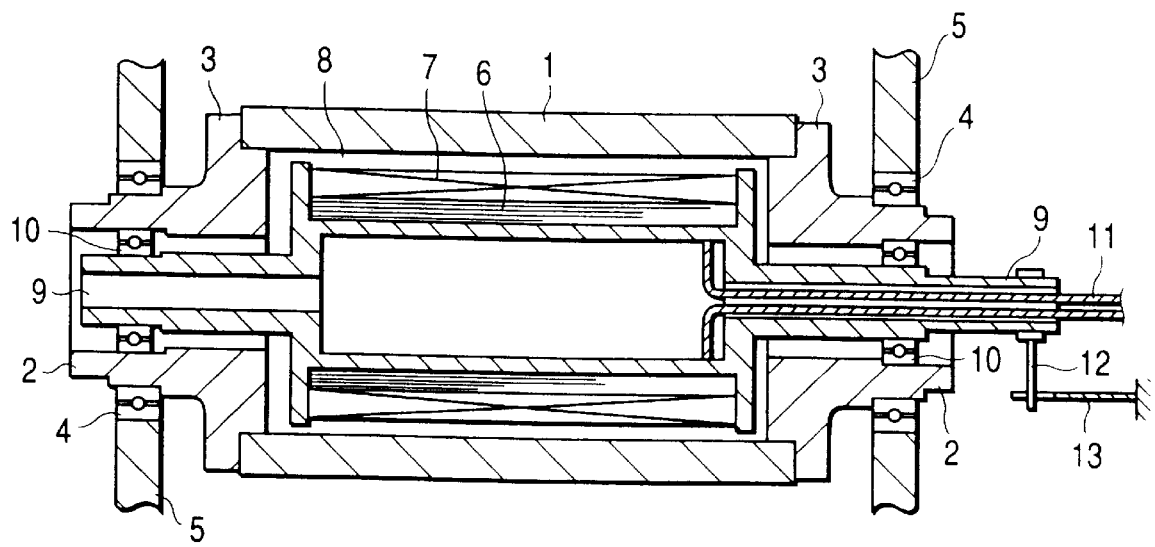
FIG. 3 is a cross sectional view showing a conventional induction heating roller apparatus.

The preferred embodiment of the present invention will be described with reference to FIG. 1. In the figure, like or equivalent portions are designated by like reference numerals in FIG. 3. Sliding bearings 14, such as metal bearings, sintered bearings, or powdery-lubricant contained metal bearings, are provided between the support rod 9 and the rolling bearings 10 according to the invention. If required, the sliding bearings 14 may be provided between the drive shafts 2 and the rolling bearings 10 or the sliding bearings 14 may be between the support rod 9 and the rolling bearings 10 and between the drive shafts 2 and the rolling bearings 10.

In the induction heating roller apparatus thus constructed, when the rolling bearings 10 are normal, or the apparatus operates in a normal state, only the rolling bearings 10 are active. Under this condition, the support rod 9 is stopped and left standstill through the turning-block action by a torque detector to be described later, while the drive shafts 2 and the roller body 1 rotate. The induction heating roller apparatus is designed such that at this time, the sliding bearings 14 do not exhibit its sliding function.

When a trouble occurs in the rolling bearings 10, a rotational torque that is transmitted from the drive shafts 2 to the support rod 9 through the rolling bearings 10 gradually increases. When the detector detects that the rotational torque has reached a predetermined torque value, the drive source of the roller body 1 is stopped in a proper way, for example, by turning off its power supply.

When the drive shafts continue its rotation by the inertia till the roller body 1 is completely stopped, and the rolling bearings 10 is damaged during the inertia rotation and a large rotational torque is applied to the support rod 9, the rotational torque causes the sliding bearings 14 to slip and hence to absorb the increased torque. Therefore, the co-rotation of the support rod 9 and the induction heating mechanism 8 is prevented. It is satisfactory that the function of the sliding bearings 14 continues till the inertia rotation of the roller body 1 stops.

Figure 2:
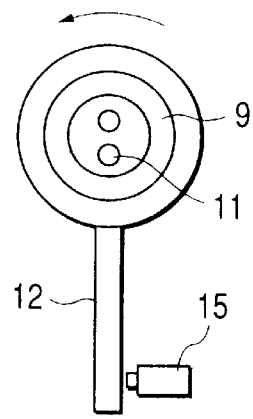
FIG. 2 is a view showing the right end of the induction heating roller apparatus of FIG. 1.

Reference numeral 15 designates a torque detector for detecting a mechanical trouble of the rolling bearings 10. In the illustrated example, the turning-block bar 12 serves also as a drive bar for the torque detector 15. In a case where, as shown in FIG. 2, the support rod 9 is rotated counterclockwise (in the direction of an arrow) by rotational resistance of the rolling bearings 10, the turning-block bar 12 is pressed against the torque detector 15 by the rotational torque. When the rolling bearings 10 are normal, the pressing force by the turning-block bar does not cause the torque detector 15 to generate an abnormal signal. The pressing by the turning-block bar prevents the support rod 9 from rotating by the co-rotation.

When a trouble occurs in the rolling bearings 10, a pressing force imparted to the torque detector 15 gradually increases by the resultant rotational torque. When the increasing pressing force reaches a predetermined value, the torque detector 15 operates to generate an abnormal signal (e.g., an electric signal). The drive shafts 2 are stopped in rotation by the utilization of the signal, for example, by turning off the power supply to the rotation drive source of the drive shafts 2 by the signal.

After the drive source is stopped, the drive shafts 2 continue their rotation by the inertia till those are completely stopped. At this time, as described above, the sliding bearings 14 act, and therefore it never happens that the support rod 9 greatly rotates, and hence that the lead wire 11 is disconnected and the torque detector 15 is damaged. The abnormal signal generates an alarm for trouble occurrence. The operator recognizes the alarm, and replaces the bearing or bearings with new one or ones. And he can start again the induction heating roller apparatus immediately after the mere replacement of the bearing. The torque detector used may be substituted by another suitable detecting means, as a matter of course.

As seen from the foregoing description, in a mechanical arrangement where a support rod for supporting an induction heating mechanism is inserted into the drive shafts of a roller body, even when rolling bearings incorporated therein are damaged and do not function well, provision of the sliding bearings impedes straightforward transmission of a rotational force from the drive shafts to the support rod. Therefore, there is no chance that the support rod rapidly and greatly increases in its turn.

What is claimed is:

1. An induction heating roller apparatus comprising:
   a hollow roller;
   driving shafts being integrally formed at both ends of said hollow roller;
   an induction heating unit disposed within said hollow roller;
   a support rod for supporting said induction heating unit, being inserted into said drive shafts;
   rolling bearings for supporting said support rod on said drive shafts, wherein said induction heating unit is supported in a suspending fashion within said roller; and
   at least one slide bearing for impeding the transmission of excessive rotational torque to said support rod, wherein said slide bearing is disposed at at least one of a first position between said support rod and rolling bearings and a second position between said drive shafts and rolling bearings.

2. The induction heating roller apparatus according to claim 1, further comprising a slide bearing being disposed between said support rod and rolling bearings and between said drive shaft and rolling bearings, respectively.

3. The induction heating roller apparatus according to claim 2, further comprising a detector for detecting a trouble of said rolling bearings.

4. The induction heating roller apparatus according to claim 1, further comprising a detector for detecting a trouble of said rolling bearings.

* * * * *